United States Patent [19]

Manning

[11] Patent Number: 5,791,294

[45] Date of Patent: Aug. 11, 1998

[54] POSITION AND PHYSIOLOGICAL DATA MONITORING AND CONTROL SYSTEM FOR ANIMAL HERDING

[75] Inventor: Charles David Hope Manning, Christchurch, New Zealand

[73] Assignee: Trimble Navigation, Sunnyvale, Calif.

[21] Appl. No.: 736,931

[22] Filed: Oct. 24, 1996

[51] Int. Cl.[6] .................................................. A01K 3/00
[52] U.S. Cl. ............................. 119/721; 119/908
[58] Field of Search ........................... 119/720, 721, 119/859, 908; 128/736

[56] References Cited

U.S. PATENT DOCUMENTS

| | | | |
|---|---|---|---|
| 3,980,051 | 9/1976 | Fury | 119/720 X |
| 4,312,360 | 1/1982 | Conway et al. | 128/736 |
| 4,651,678 | 3/1987 | Kime | 54/71 |
| 4,898,120 | 2/1990 | Brose | 119/721 |
| 5,335,626 | 8/1994 | Calabrese | 119/721 |
| 5,435,271 | 7/1995 | Touchton et al. | 119/908 X |
| 5,533,469 | 7/1996 | Touchton et al. | 119/908 X |
| 5,610,588 | 3/1997 | Yarnal, Jr. et al. | 119/908 X |

*Primary Examiner*—Robert P. Swiatek
*Assistant Examiner*—Elizabeth Shaw
*Attorney, Agent, or Firm*—Wagner, Murabito & Hao

[57] ABSTRACT

An apparatus and method for monitoring and controlling the position of an animal. A mounted subsystem, affixed to an animal, includes a first computer control system having a first input/output device (first I/O), a position determining system (PDS), a first transceiver, sensors, and stimulators. The PDS can be a GPS system or other type of position determining system. The stimulators include a rear stimulator affixed to the hind quarters of the animal for motivating the animal to move forward, a right stimulator affixed to the right side of the animal for motivating the animal to move to its left, and a left stimulator affixed to the left side of the animal for motivating the animal to move to its right. A base subsystem includes a second computer control system having a second transceiver. Position control instructions control the stimulators in order to control the position of the animal. A memory map is read from computer readable memory units. Control instructions are received defining a designated sector. Position information, received from the PDS, indicates an initial position of the animal. It is then determined whether the animal is within the designated sector. If not, the animal is stimulated so that the animal moves to the designated sector. Stimulation vectors are determined based on the initial position of the animal and the position of the designated sector. Stimulators are then driven in order to motivate the animal to move in the desired direction.

25 Claims, 10 Drawing Sheets

POSITION AND PHYSIOLOGICAL DATA MONITORING AND CONTROL SYSTEM FOR ANIMAL HERDING

TECHNICAL FIELD

The present invention relates to remote systems for animal herding. Specifically, the present invention relates to a position and physiological data monitoring and position control system for animal herding.

BACKGROUND ART

Prior art electronic animal control systems are used to limit the range of movement of an animal to a space within a defined boundary. In typical prior art electronic animal control systems, a mounted system including a radio receiver is mounted upon an animal in order to detect a signal from a radio transmitter. The mounted system delivers a stimulus to the animal in response to the received signal. Transducers are typically employed for applying an electric shock and/or an audible stimulus to the animal as motivational stimuli to either discourage the animal from entering a certain area or to confine the animal within a certain area.

Transmitting antennae have been used in the prior art to define the boundary of an area relative to which the animal is to be controlled. An antenna may define an area from which the animal is to be discouraged from entering or may alternatively define an area in which the animal is to be confined. Some prior art electronic animal control systems use a perimeter wire placed at the boundary of a defined area so to generate a field for delivering an aversive stimulus to the animal. Other prior art electronic animal control systems use a transmitter station having an antenna defining a lobe which defines an area in which the animal is to be confined or from which the animal is to be excluded.

A problem associated with the above described prior art electronic animal control systems is that such systems provide no indication of whether the subject animal has responded properly to the control stimuli. Another problem is that the above described prior art electronic animal control systems do not provide means for actually moving an animal to selectable positions. The above described prior art electronic animal control systems only provide means for confining an animal to a defined area or for excluding an animal from a defined area.

Thus a need exists for an animal control system which provide means for actually moving an animal to selectable positions. A further need exists for an animal control system which provides an indication to the user concerning whether the subject animal has responded properly to control stimuli.

DISCLOSURE OF THE INVENTION

The present invention provides an apparatus and method for monitoring and controlling the position of an animal. The present invention also provides an apparatus and method for remote monitoring of the physiological status of an animal.

The apparatus of the present invention includes a first subsystem which is mounted to an animal. The first subsystem includes a first processor coupled to a first bus, a first physical memory coupled to the first bus, a first input/output device (first I/O) coupled to the first bus, a position determining system (PDS) coupled to the first I/O, a first transceiver coupled to the first I/O, and stimulators coupled to the first I/O. The PDS can be a global positioning system (GPS) or other type of PDS. In a preferred embodiment of the present invention, the stimulators include a rear stimulator affixed to the hind quarters of the animal for motivating the animal to move forward, a right stimulator affixed to the right side of the animal for motivating the animal to move to its left, and a left stimulator affixed to the left side of the animal for motivating the animal to move to its right. The stimulators can include a transducer for providing either an electrical shock to the animal or an audible stimulus to the animal.

A base subsystem, remote from the first subsystem, comprises a second processor coupled to a second bus, a second physical memory coupled to the second bus, a second input/output device (second I/O) coupled to the second bus, and a second transceiver coupled to the I/O. The second transceiver transmits position control instructions to the receiver. Position control instructions control the stimulators in order to control the position of the animal.

The present invention also includes a method for controlling the position of an animal. The method comprises a plurality of computer implemented steps. A memory map of an area, within which the animal is located, is read from computer readable memory units. Control instructions are received for controlling the position of the animal. The control instructions define a designated zone within which the animal is to be confined or to which the animal is to be moved. Position information, received from the PDS, indicates an initial position of the animal. It is then determined whether the animal is within the designated zone. If the animal is within the designated zone, no stimulation is applied to the animal. If the animal is not within the designated zone, steps are taken to stimulate the animal so that the animal moves to the designated zone.

In one embodiment, the orientation of the animal is determined by receiving compass data from a compass which is mounted to the animal and coupled to the first I/O of the mounted subsystem. In another embodiment, the orientation of the animal is determined by: (1) applying an initial stimulation to the animal via stimulators located on the hind quarters of the animal, wherein the animal is assumed to respond to the initial stimulation on its hind quarters by moving forward, (2) waiting a predetermined amount of time for the animal to respond to the initial stimulation, (3) receiving information from the PDS indicating a second position of the animal, and (4) determining the orientation of the animal by comparing the first position of the animal with the second position of the animal.

A direction is determined in which the animal is to proceed in order to move the animal to the designated zone. Stimulation vectors are determined based on the determined orientation of the animal, the initial position of the animal, and the position of the designated zone. Stimulators are then driven in order to motivate the animal to move in the desired direction.

Specific applications of the present invention include herding cattle to a milking shed at milking time, herding animals at muster time or when bad weather is expected, causing breeding females to report when ovulation is detected, controlling use of a grazing range, and keeping two bulls apart.

These and other advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "reading", "receiving", "determining", "driving" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

Figure 1A:
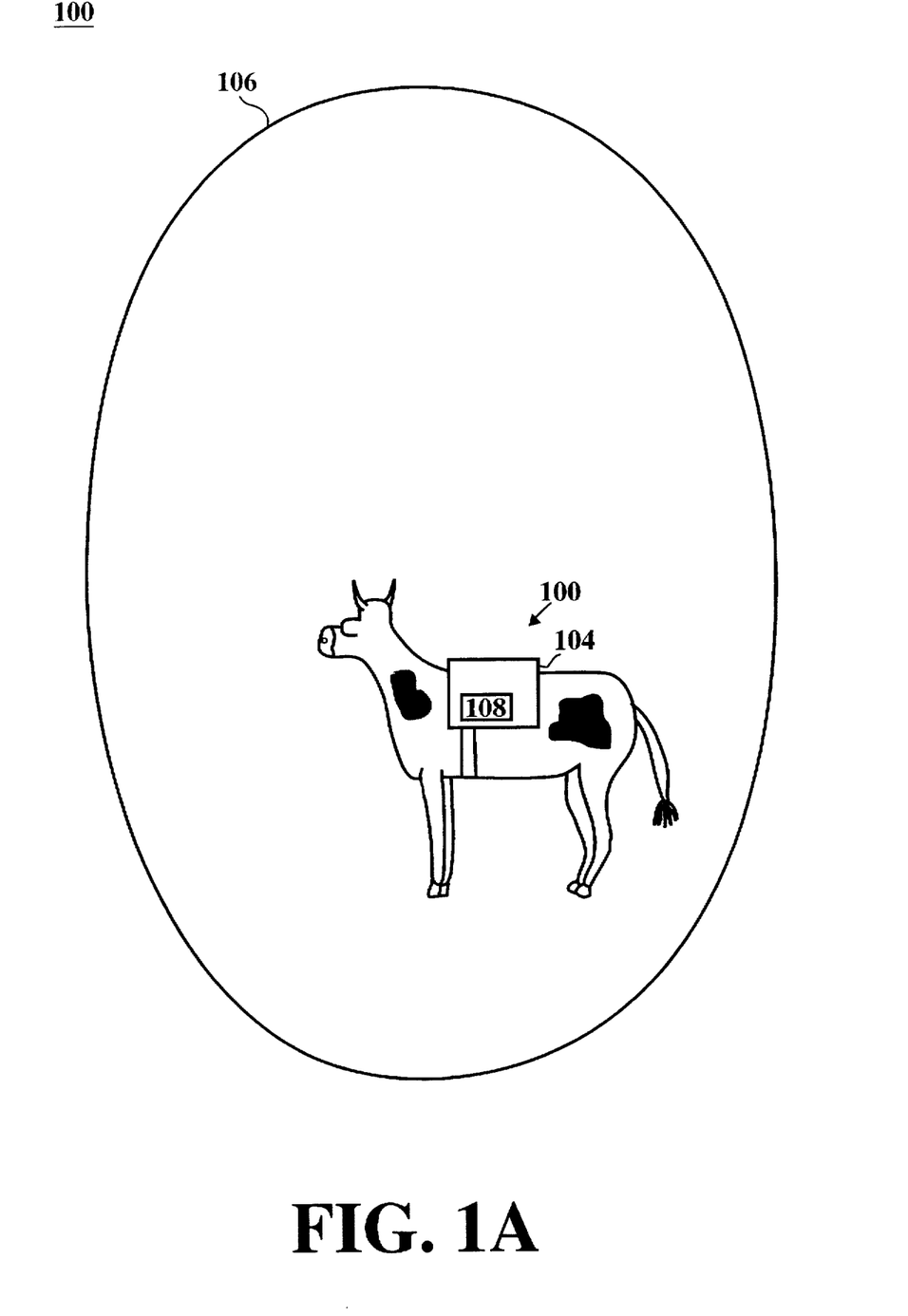
FIG. 1A is a logical representation of an autonomous position and physiological data monitoring and control system (autonomous PPDMCS) according to the present invention.

With reference to FIG. 1A, a logical representation is shown of an autonomous position and physiological data monitoring and control system (autonomous PPDMCS) 100 according to the present invention. In the autonomous PPDMCS 100, an animal 102 has a harness 104 affixed thereto. Animal 102 can be a farm animal, a human, a pet, or any other type of animal. In a preferred embodiment of the present invention, animal 102 is positioned within an area 106 which can be electronically mapped. In the autonomous PPDMCS 100, harness 104 contains an autonomous PPDMCS animal mounted subsystem 108.

Figure 1B:
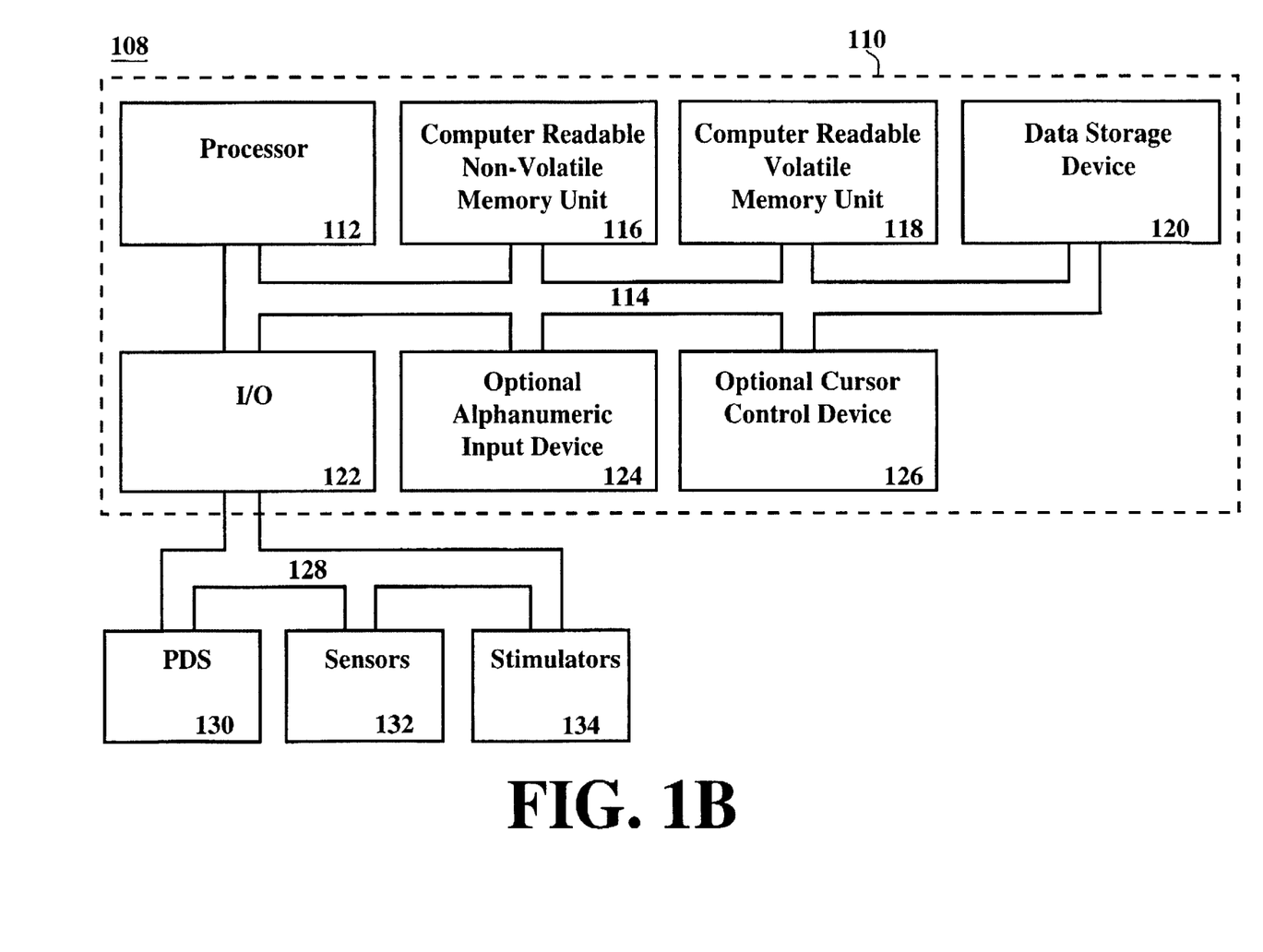
FIG. 1B is a logical block diagram of an autonomous PPDMCS animal mounted subsystem of the present invention.

With reference to FIG. 1B, a logical block diagram is shown of autonomous PPDMCS animal mounted subsystem 108 of the autonomous PPDMCS 100. Autonomous PPDMCS animal mounted subsystem 108 includes a mounted computer control unit 110 comprising a processor 112 coupled to a BUS 114, a computer readable non-volatile memory unit 116 coupled to BUS 114, a computer readable volatile memory unit 118 coupled to BUS 114, a data storage device 120 coupled to BUS 114, an input/output device (I/O) 122 coupled to BUS 114, an optional alphanumeric input device 124 coupled to BUS 114, and an optional cursor control device 126 coupled to BUS 114. Alphanumeric input device 124 includes alphanumeric and function keys for communicating information and command selections to processor 112. Cursor control device 126 communicates user input information and command selections to processor 112. I/O 122 is coupled to an I/O BUS 128. Autonomous PPDMCS animal mounted subsystem 108 of the present invention also includes a PDS 130 coupled to I/O BUS 128, sensors 132 coupled to I/O BUS 128, and stimulators 134 coupled to I/O BUS 128.

With reference to FIGS. 1A and 1B, in the present embodiment, computer readable memory units of mounted computer control unit 110 are used to store an electronic map of area 106 of FIG. 1A. Area 106 can include any type of terrain including flat land, hills, mountains, bodies of water, etc.

With reference still to FIG. 1B, PDS 130 generates position information indicating, for example, the latitude, longitude, altitude, and velocity of animal 102.

PDS 130 also accurately determines the time at which animal 102 is at a specific location. In the present invention, PDS 130 is, for example, a satellite-based radio navigation system such as the Global Positioning System (GPS), or the Global Orbiting Navigational System (GLONASS). Although such systems are specifically mentioned in the present embodiment, the present invention is also well suited to land-based radio navigation systems such as, for example, LORAN, FM subcarrier based systems, and the like. FM subcarrier positioning techniques are described, for example, in U.S. Pat. Nos. 5,173,710 and 5,280,295 to Kelley et al., both entitled "Navigation and Positioning System and Method Using Uncoordinated Beacon Signals" filed Aug. 15, 1991, and Dec. 22, 1992, respectively. U.S. Pat. Nos. 5,173,710 and 5,280,295 are incorporated herein by reference as background material. Additionally, the present invention is also well suited to recording GPS ephemeris data. Likewise the present invention is also well suited to recording position information which has undergone differential corrections to provide more accurate position information. Such differential correction systems are described in detail in U.S. Pat. No. 5,477,228 to Tiwari et al. entitled "Differential Global Positioning System Using Radio Data System" filed Apr. 13, 1993. U.S. Pat. No. 5,477,228 is incorporated herein by reference as background material.

With reference still to FIG. 1B, mounted computer control unit 110 receives position information from PDS 130. Mounted computer control unit 110 also receives data from sensors 132 via I/O BUS 128. Sensors 132 are mounted on animal 102 and include physiological monitoring devices for monitoring the health status and vital statistics of animal 102. In the present invention, sensors 132 include devices for detecting the body temperature, hormone levels, milk level, and ovulation status of animal 102. It will be understood that the present invention is also well suited to the use of various other physiological monitoring devices. Sensors 132 can also include an electronic compass affixed to animal 102 for providing mounted computer control unit 110 with data representative of the current orientation of animal 102. Additionally, sensors 132 can include a barometer, thermometer, or other weather detection device. Data from sensors 132 and PDS 130 is stored in computer readable memory units of mounted computer control unit 110.

With reference still to FIG. 1B, stimulators 134 are attached to animal 102 of FIG. 1A. Stimulators 134 of the present invention include a transducer for providing an electrical shock to animal 102 or a transducer for providing an audible stimulus to animal 102. Stimulators 134 include one or more separate transducers affixed to various parts of animal 102. In one embodiment of the present invention, stimulators 134 include three transducers attached to animal 102. A rear transducer is affixed to the hind quarters of animal 102, a right transducer is affixed to the right side of animal 102, and a left transducer is affixed to the left side of animal 102. By activating the rear transducer, animal 102 is inclined to move forward. By activating the left transducer, animal 102 is inclined to move to the animal's right. By activating the right transducer, animal 102 is inclined to move to the animal's left. In autonomous PPDMCS 100 of FIG. 1A, stimulators 134 can be controlled by mounted computer control unit 110. Computer readable memory units of mounted computer control unit 110 can be used to store program code for implementing processes of the present invention for monitoring and controlling the position of animal 102. Processes implemented by the autonomous PPDMCS 100 are executed over processor 112 as is described below.

Figure 2A:
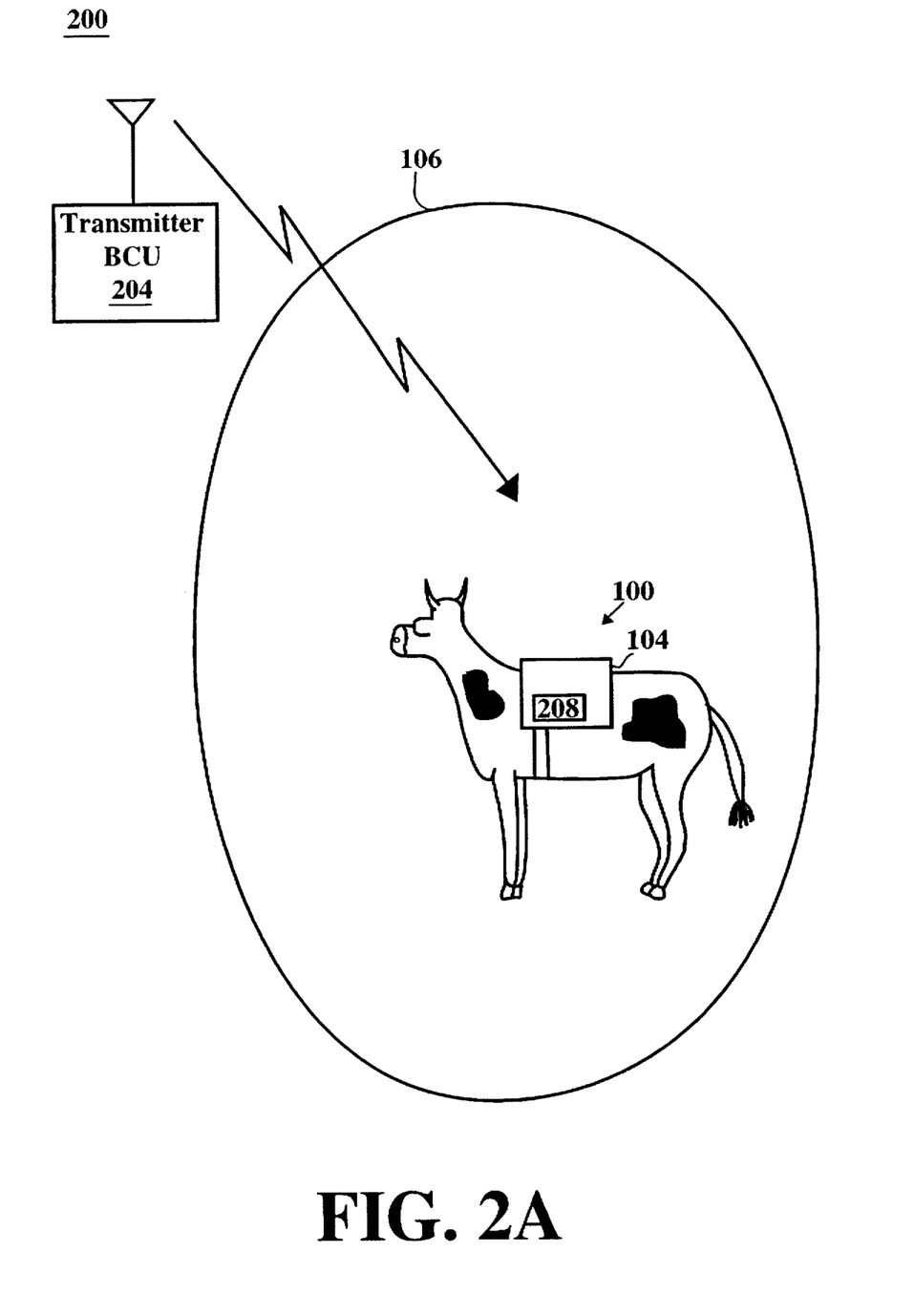
FIG. 2A is a logical representation of a one-way PPDMCS according to the present invention.

With reference to FIG. 2A, a logical representation is shown of a one-way position and physiological data monitoring and control system (one-way PPDMCS) 200 according to the present invention. As in the autonomous PPDMCS 100 of FIG. 1A, one-way PPDMCS 200 includes animal 102 fitted with harness 104 and positioned within area 106. One-way PPDMCS 200 utilizes a one-way communication link 202 to allow control of the one-way PPDMCS 200 from a transmitter base control unit (transmitter BCU) 204 located at a position remote from animal 102. For example, transmitter BCU 204 can be positioned in a farmhouse. Transmitter BCU 204 provides control signals, via one-way communication link 202, to a one-way PPDMCS animal mounted subsystem 208 which is attached to harness 104.

Figure 2B:
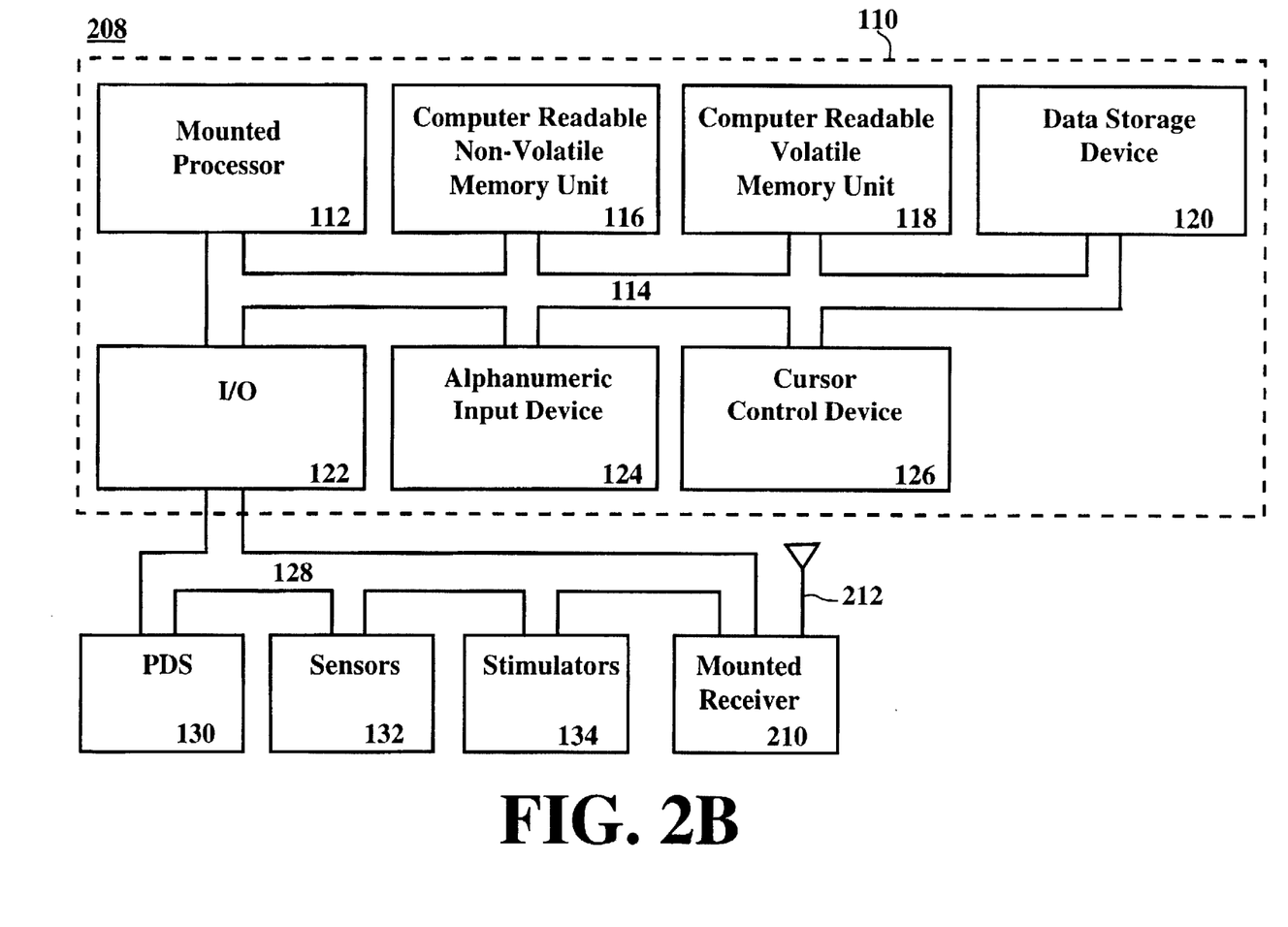
FIG. 2B is a logical block diagram of a one-way PPDMCS animal mounted subsystem of the one-way PPDMCS of the present invention.

With reference to FIG. 2B, a logical block diagram is shown of one-way PPDMCS animal mounted subsystem 208 of the one-way PPDMCS 200. One-way PPDMCS animal mounted subsystem 208 includes mounted computer control unit 110 coupled to I/O BUS 128. One-way animal mounted subsystem 208 also includes positioning determining system (PDS) 130 coupled to I/O BUS 128, sensors 132 coupled to I/O BUS 128, stimulators 134 coupled to I/O BUS 128, and a mounted receiver 210 coupled to I/O BUS 128. Mounted receiver 210 includes an antenna 212 which receives control signals from transmitter BCU 204 via one-way communication link 202 both of FIG. 2A.

Figure 2C:
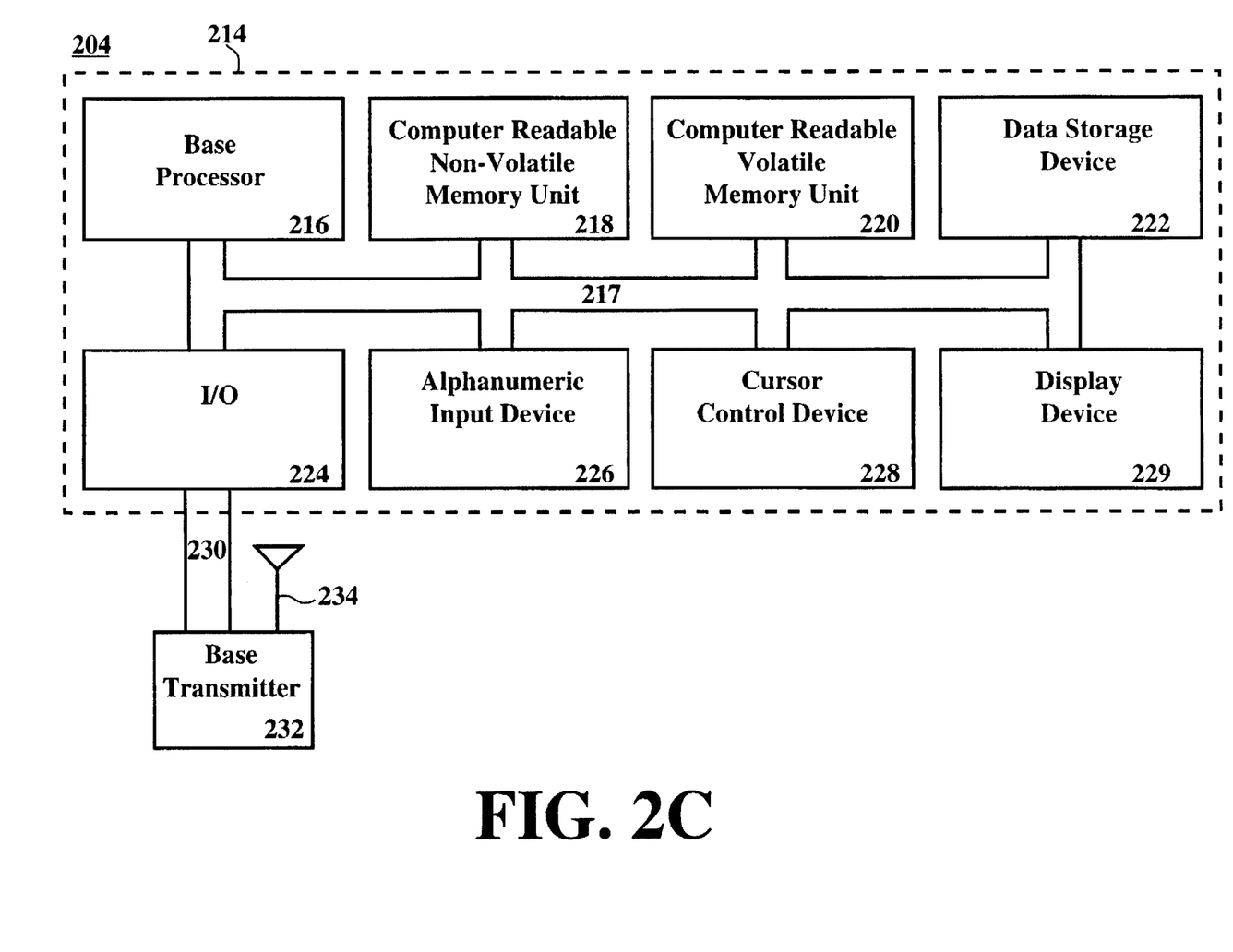
FIG. 2C is a logical block diagram of a transmitter base control unit (transmitter BCU) of the one-way PPDMCS of the present invention.

With reference to FIG. 2C, a logical block diagram is shown of transmitter BCU 204 of FIG. 2A. Transmitter BCU 204 includes a BCU computer control unit 214 comprising a base processor 216 coupled to a BUS 217, a computer readable non-volatile memory unit 218 coupled to BUS 217, a computer readable volatile memory unit 220 coupled to BUS 217, a data storage device 222 coupled to BUS 217, an input/output device (I/O) 224 coupled to BUS 217, an alphanumeric input device 226 coupled to BUS 217, a cursor control device 228 coupled to BUS 217, and a display device 229 coupled to BUS 217. Alphanumeric device 226 includes alphanumeric and function keys for communicating information and command selections to processor 216. Cursor control device 228 communicates user input information and command selections to processor 216. I/O 224 is coupled to an I/O BUS 230. A base transmitter 232, having an antenna 234, is coupled to I/O BUS 230. Transmitter 238 transmits control instructions from BCU computer control unit 214 to mounted receiver 210 of FIG. 2B via communication link 202 of FIG. 2A.

With reference to FIGS. 2B and 2C, computer readable memory units of base computer control unit 214, or of mounted computer control unit 110, can be used to store an electronic map of area 106 of FIG. 1A. Computer readable memory units of base computer control unit 214, or of mounted computer control unit 110, can also be used to store program code for implementing processes of the present invention for monitoring and controlling the position of animal 102. Processes implemented by the one-way PPDMCS 200 can be executed over base processor 216 or over mounted processor 112. Processes of the present invention, for monitoring and controlling the position of animal 102, are described further below.

Figure 3A:
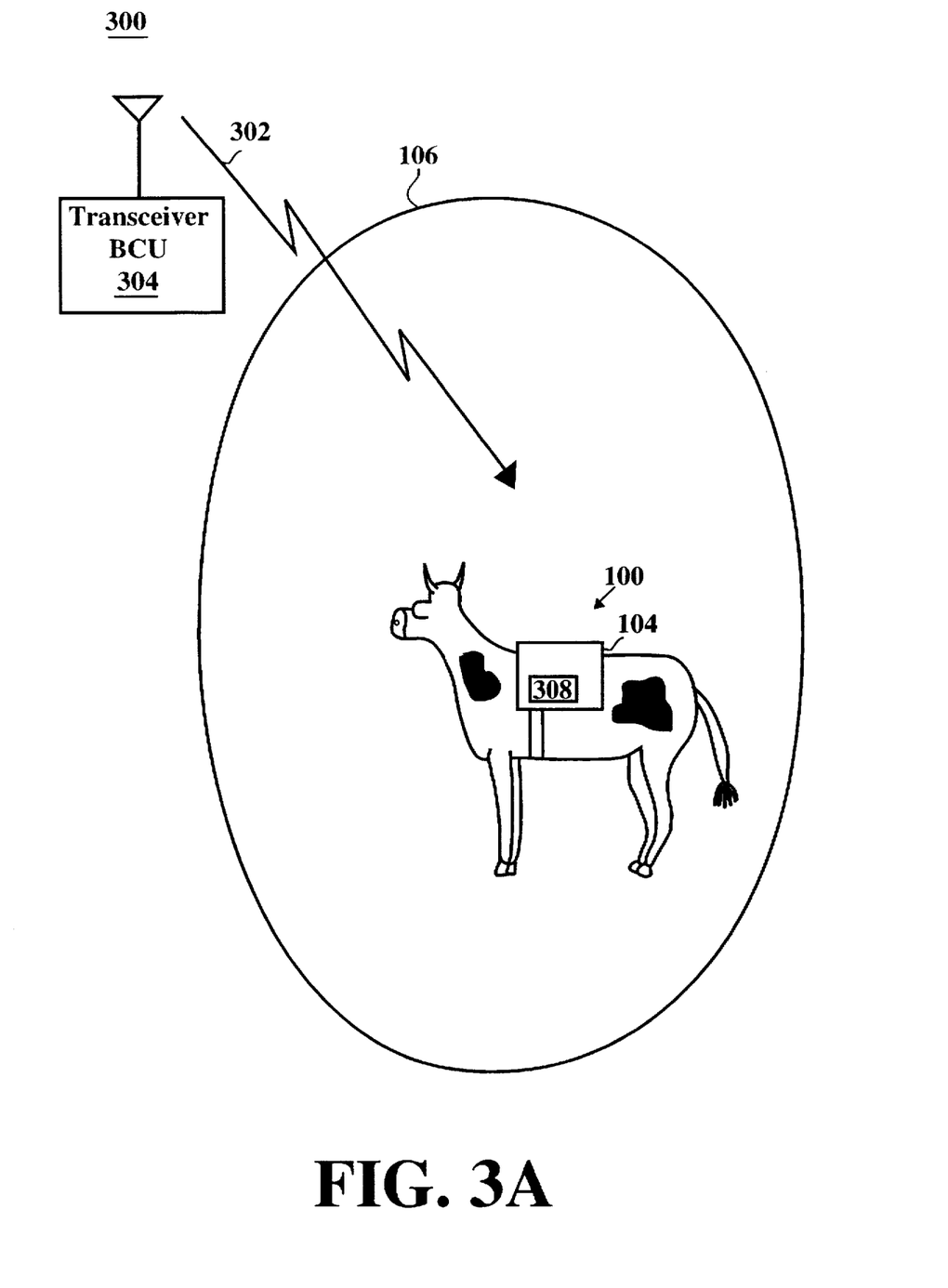
FIG. 3A is a logical representation of a two-way PPDMCS according to the present invention.

With reference to FIG. 3A, a logical representation is shown of a two-way position and physiological data monitoring and control system (two-way PPDMCS) 300 according to the present invention. Two-way PPDMCS 300 includes animal 102 fitted with harness 104 and positioned within area 106. Two-way PPDMCS 300 utilizes a two-way communication link 302. Two-way communication link 302 allows control of the two-way PPDMCS 300 from a transceiver base control unit (transceiver BCU) 304 located at a position away from animal 102. For example, transceiver BCU 304 can be positioned in a farmhouse. Transceiver BCU 304 provides control signals, via two-way communication link 302, to a two-way PPDMCS animal mounted subsystem 308. Transceiver BCU 304 also receives sensor data signals, via two-way communication link 302, from two-way PPDMCS animal mounted subsystem 308.

Figure 3B:
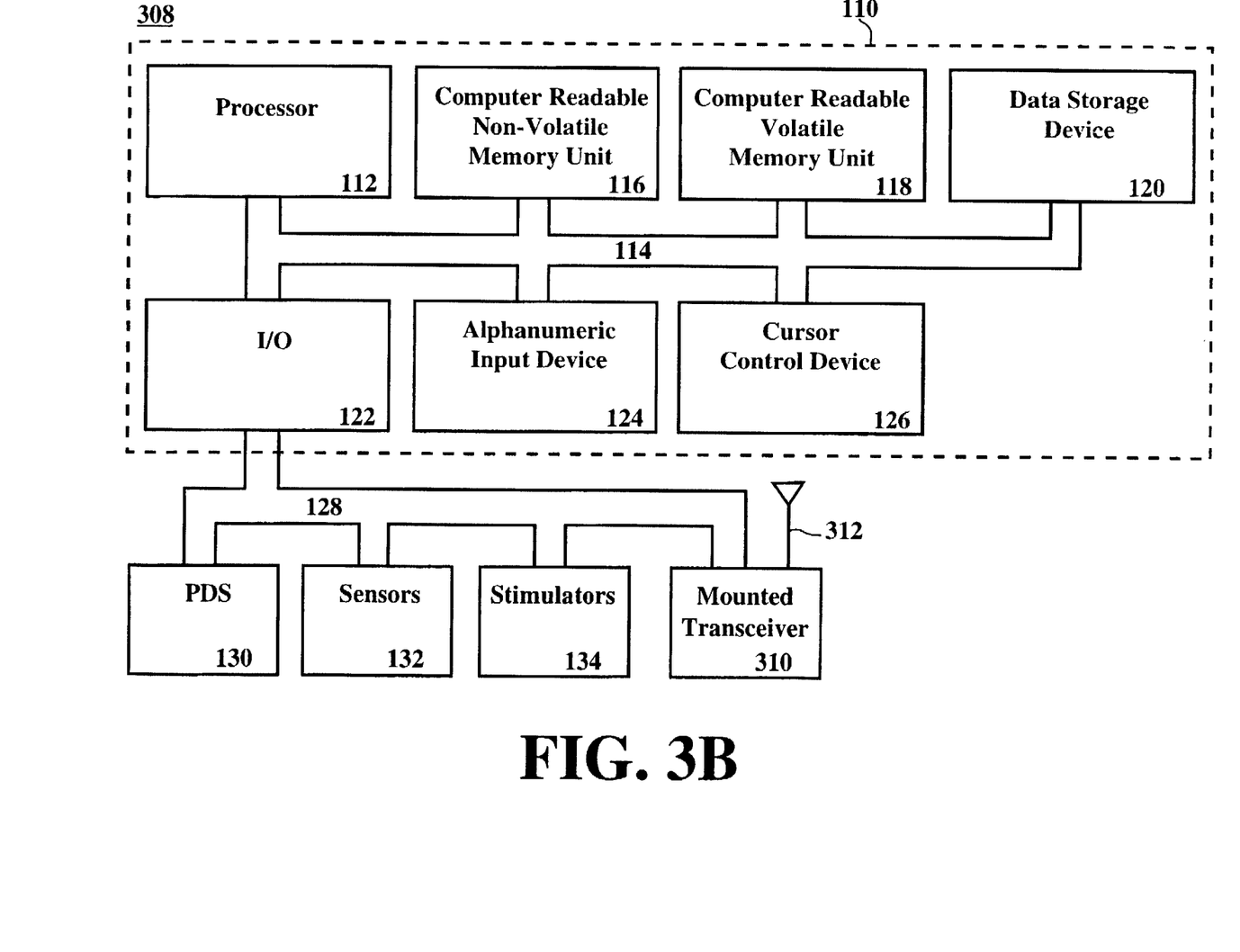
FIG. 3B is a logical block diagram of a two-way PPDMCS animal mounted subsystem of the two-way PPDMCS of the present invention.

With reference to FIG. 3B, a logical block diagram is shown of a two-way animal mounted subsystem 308 of the two-way PPDMCS 300. Two-way animal mounted subsystem 308 includes mounted computer control unit 110 coupled to I/O BUS 128. Two-way animal mounted subsystem 308 also includes positioning determining system (PDS) 130 coupled to I/O BUS 128, sensors 132 coupled to I/O BUS 128, stimulators 134 coupled to I/O BUS 128, and a mounted transceiver 310 coupled to I/O BUS 128. Mounted transceiver 310 receives control signals from transceiver BCU 304 via two-way communication link 302. Mounted transceiver 310 transmits sensor data signals to transceiver BCU 204 via two-way communication link 302.

Figure 3C:
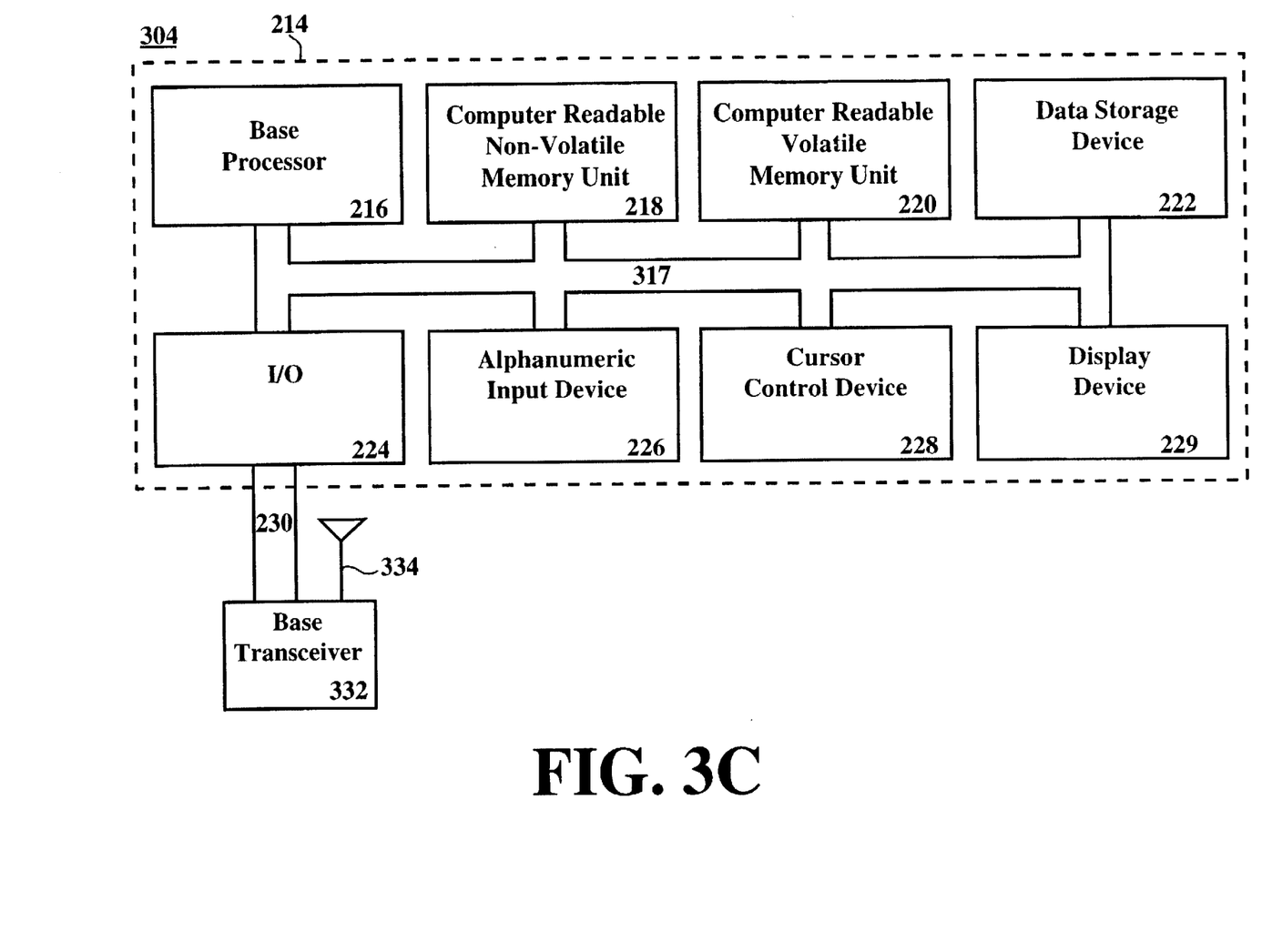
FIG. 3C is a logical block diagram of a transceiver base control unit (transceiver BCU) of the two-way PPDMCS of the present invention.

With reference to FIG. 3C, a logical block diagram is shown of transceiver BCU 304 of FIG. 3A. Transceiver BCU 304 includes BCU computer control unit 214 with I/O 224 coupled to I/O BUS 230. A base transceiver 332, having an antenna 334, is coupled to I/O BUS 230. Base transceiver 332 transmits position control instructions from BCU computer control unit 214 to mounted transceiver 310 of FIG. 3B. Base transceiver 332 receives sensor data signals and position data signals transmitted from mounted transceiver 310 of FIG. 3B. Sensor data signals include data from stimulators 134 of FIG. 3B. Position data signals include data from PDS 130 also of FIG. 3B.

With reference to FIGS. 3B and 3C, computer readable memory units of mounted computer control unit 110 or of base computer control unit 214, can be used to store program code for implementing processes of the present invention for monitoring and controlling the position of animal 102. Processes implemented by the two-way PPDMCS 300 can be executed over mounted processor 112 or over base processor 216 as is further described below.

In the present invention, communication links 202 and 302 are established through any of various techniques. For example, communication links 202 and 302 can be established using a Metricomm Wide Area Network (WAN) link operating at approximately 900 MHz. Communication links 202 and 302 can be established using a standard cellular telephone connection. Communication links 202 and 302 can also be established using a trunked radio system. In such a system for example, base transmitter 232 or base transceiver 332 first contacts a communication base and is assigned a communication channel. Communication between base transmitter 232 (or base transceiver 332) and mounted receiver 210 (or mounted transceiver 310) must take place over the assigned channel. Communication links 202 and 302 can also be established using a Cellular Digital Packet Data (CDPD) protocol. In the CDPD protocol, a modem and a radio are used to send data at a rate of 19.2 Kbits/s over cellular circuits not currently being used for voice transmissions. A control channel is called, for example, by base transmitter 232 (or base transceiver 332) and base transmitter 232 (or base transceiver 332) is assigned a channel. Base transmitter 232 (or base transceiver 332) then bursts packet data, using, for example, TCP/IP protocol, to deliver the data to mounted receiver 210 (or mounted transceiver 310) until the data is completely transmitted or until the channel is no longer free. If the data is not completely transferred when the channel expires, communication links 202 and 302 are then established using a different channel. As yet another example, communication links 202 and 302 can be established using a Subscription Mobile Radio (SMR) system wherein an assigned frequency is used for communication links 202 and 302. The present invention is also well suited to having RF-based communication links 202 and 302. The FCC has assigned new frequency bands in the 2 GHz range for use by the so-called Personal Communication Systems or networks; such services will no doubt be offered by telephone companies in the future, and represent yet an additional means for linking base transmitter 232 and mounted receiver 210 (FIGS. 2B and 2C) or linking base transceiver 332 to mounted transceiver 310 (FIGS. 3B and 3C).

Figure 4:
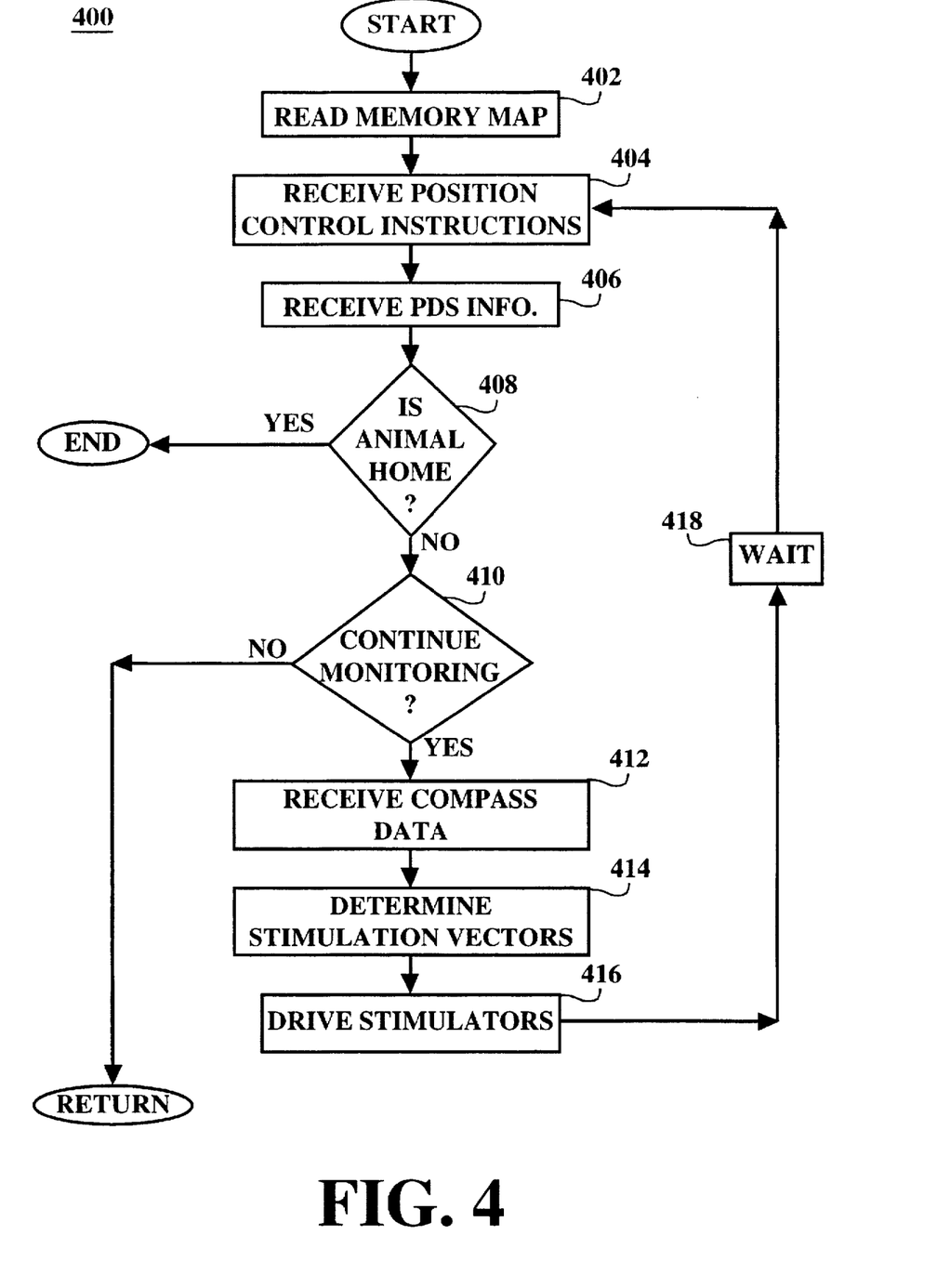
FIG. 4 is a logical flow diagram for a first animal position control process according to the present invention.

With reference to FIG. 4, a flow diagram for a first animal position monitoring and control process 400 according to the present invention is shown. Process 400 can be implemented by autonomous PPDMCS 100, one-way PPDMCS 200, or two-way PPDMCS 300. Process 400 can be implemented as program code stored in computer readable memory units of mounted computer control unit 110 (FIGS. 1B, 2B, and 3B). Process 400 can also be implemented as program code stored in computer readable memory units of base computer control unit 214 (FIGS. 2C and 3C). The program code can be executed over mounted processor 112 (FIGS. 1B, 2B, and 3B) or base processor 216 (FIGS. 2C and 3C).

With reference to FIG. 4, in step 402, the present invention reads a memory map of area 106 of FIGS. 1A, 2A, and 3A. In autonomous PPDMCS 100, one-way PPDMCS 200, or two-way PPDMCS 300, the memory map can be read by mounted processor 112 from a computer readable memory unit of mounted computer control unit 110. In one-way PPDMCS 200 and two-way PPDMCS 300 of the present invention, a memory map of area 106 is read by base processor 216 from a computer readable memory unit of base computer control unit 214 of FIGS. 2C and 3C and transmitted to mounted computer control unit 110 via communication links 202, 302 of FIGS. 2A, 3A, 2B, and 3B.

With reference still to FIG. 4, in step 404, the present invention receives position control instructions. In autonomous PPDMCS 100 (FIG. 1A) of the present invention, processor 112 of mounted computer control unit 110 reads position control instructions from program code stored in a computer readable memory unit of mounted computer control unit 112. Position control instructions can be entered by a user into a computer readable memory unit of mounted computer control unit 112 (FIGS. 1B, 2B, and 3B) via optional alphanumeric input device 124 or optional cursor control device 126. In one-way PPDMCS 200 and two-way PPDMCS 300 of the present invention, base processor 216 of base computer control unit 214 reads control instructions from program code stored in computer readable memory units of base computer control unit 214 (FIGS. 2C and 3C). Position control instructions can be entered by a user into computer readable memory units of base computer control unit 214 via alphanumeric input device 226 or cursor control device 228. In the present invention, position control instructions include instructions to move animal 102 to a designated sector, "home", within area 106 or instructions to confine animal 102 to a designated sector. "home", within area 106. For example, position control instructions received by the present invention can define "home" as a corral, a trough, a field, etc. Position control instructions can vary according to times of the day, week, or year. Position control instructions can also vary according to factors such as sensor information.

In step 406 of FIG. 4, the present invention receives position information from PDS 130 (FIGS. 1B, 2B, and 3B) indicating the position of animal 102.

With reference still to FIG. 4, in step 408, the present invention determines whether animal 102 is located in the position defined as "home". "Home" is defined by position control instructions, received in step 404 above, as a designated sector within area 106. Step 408 is implemented by determining whether the current position of animal 102, received from PDS 130 in step 406, is coincident with the area defined as "home" in step 404. Provided that the current position of animal 102 is coincident with the area defined as "home" in step 404, process 400 of the present invention returns. Provided that the current position of animal 102 is not coincident with the area defined as "home" in step 404, process 400 of the present invention proceeds to step 410.

With reference still to FIG. 4, in step 410, the present invention determines whether first animal position monitoring and control process 400 is to continue monitoring and controlling the position of animal 102. In one-way PPDMCS 200 and two-way PPDMCS 300 of the present invention, an instruction can be entered by a user into base computer control unit 214, via alphanumeric input device 226 or cursor control device 228, to instruct the one-way PPDMCS 200 and two-way PPDMCS 300 to either continue or discontinue monitoring and control. If an instruction to discontinue monitoring is active, process 400 of the present invention returns. If an instruction to continue monitoring and control is active, process 400 of the present invention proceeds to step 412.

With reference still to FIG. 4, in step 412, the present invention receives compass data from sensors 132 (FIGS. 1B, 2B, and 3B) wherein the compass data is representative of the orientation of animal 102. In so doing, the present invention determines which way animal 102 is facing so that the present invention can appropriately drive stimulators to move the animal to a desired location.

With reference still to FIG. 4, in step 414, the present invention determines stimulation vectors defining a direction in which animal 102 should proceed in order to go "home". Stimulation vectors are determined based on the orientation of animal 102, the current position of animal 102, and the current area defined as "home". For example, animal 102 is standing at position A and facing due north while "home" is located due north of position A. In this case, the present invention defines stimulation vectors to direct animal 102 to move from point A to "home". If no barrier exists in area 106 between point A and "home", then the present invention will define stimulation vectors to direct animal 102 due north towards "home". If a barrier, such as a lake, exists in area 106 between point A and "home", then the present invention will define stimulation vectors to direct animal 102 around the barrier and toward "home".

With reference still to FIG. 4, in step 416, the present invention drives stimulators 134 in order to motivate animal 102 to move in the direction defined by the stimulation vectors determined in step 414. As previously mentioned, the stimulators include a rear stimulator affixed to the hind quarters of the animal for motivating the animal to move forward, a right stimulator affixed to the right side of the animal for motivating the animal to move to its left, and a left stimulator affixed to the left side of the animal for motivating the animal to move to its right.

After driving stimulators 134 according to the stimulation vectors determined in step 414, the present invention performs step 418 which delays process 400 of the present invention for a predetermined time interval. After the predetermined time interval of step 418 has elapsed, process 400 of the present invention proceeds back to step 404.

Figure 5:
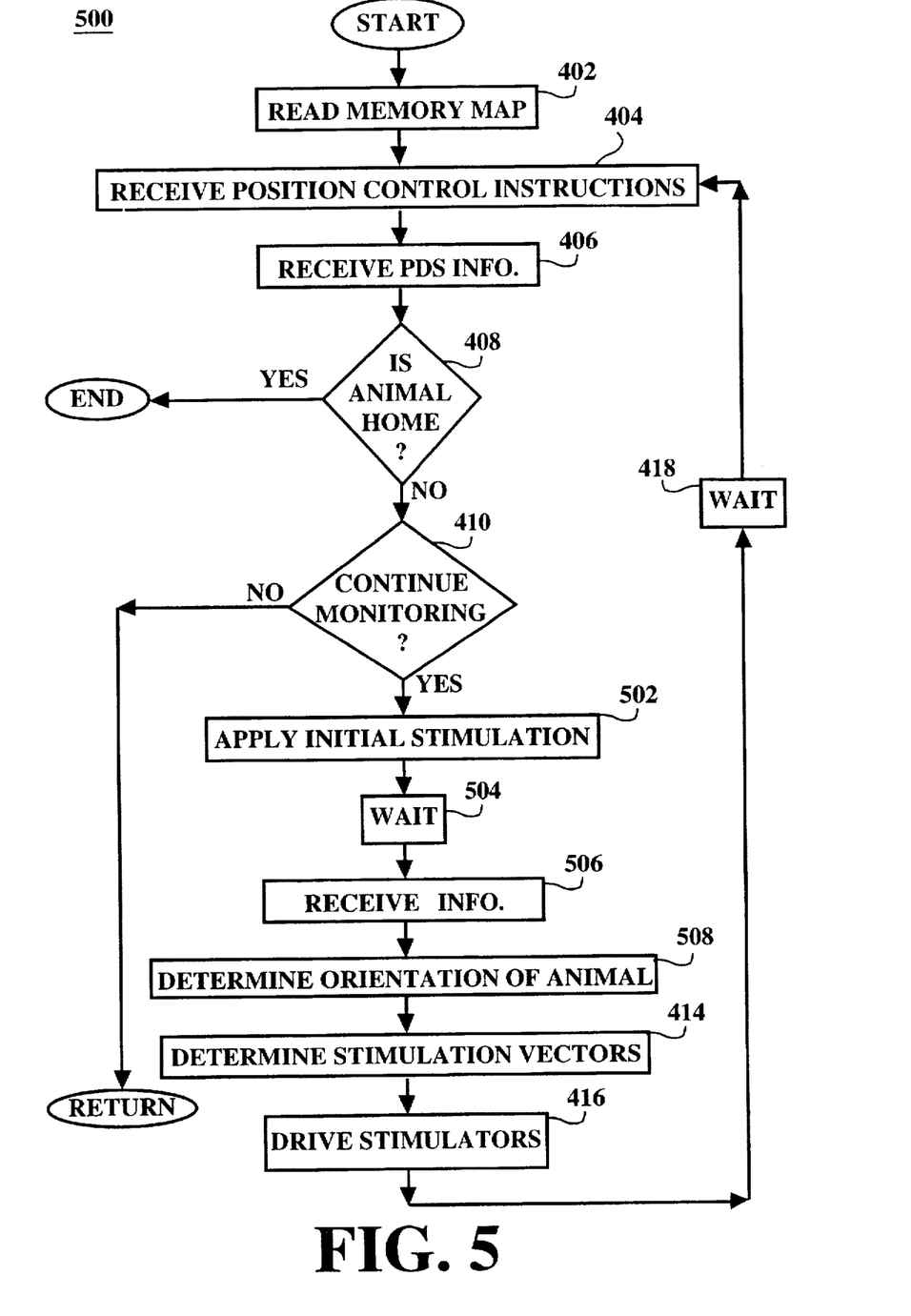
FIG. 5 is a logical flow diagram for a second animal position control process according to the present invention.

With reference to FIG. 5, a flow diagram for a second animal position monitoring and control process 500 according to the present invention is shown. Process 500 is similar to process 400 except that process 500 does not use a compass to determine the orientation of animal 102. Process 500 includes steps 402, 404, 406, 408, 410, 414, 416, and 418 of process 400. Step 412 of process 400, receiving compass data, is not included in process 500 and is replaced by steps 502, 504, and 506 (FIGS. 4 and 5).

In step 502 of FIG. 5, the present invention applies an initial stimulation to animal 102 of FIG. 1 via stimulators 134 of FIG. 1B. In an embodiment of the present invention, a stimulator 134, located on the hind quarters of animal 102, is activated. Animal 102 is assumed to respond to initial stimulation on its hind quarters by moving forward. It may be necessary to train certain types of animals 102 to move forward in response to motivational stimulation on the hind quarters of animal 102.

In step 504 of FIG. 5, process 500 of the present invention waits a predetermined amount of time for animal 102 to respond to initial stimulation on its hind quarters.

In step 506 of FIG. 5, the present invention receives information from PDS 130 of FIGS. 1B, 2B, and 3B indicating the latest position of animal 102.

In step 508 of FIG. 5, the present invention determines the orientation of animal 102 by comparing the position of animal 102 determined in step 406, before initial stimulation, with the position of animal 102 determined in step 506, after initial stimulation. Assuming that animal 102 moved forward in response to the initial stimulation applied to its hind quarters in step 502, the present invention determines the orientation of animal 102 by comparing the initial position of animal 102, determined in step 406, with the position of animal 102 determined in step 506 after initial stimulation. After determining the orientation of animal 102, process 500 of the present invention proceeds to step 414 and continues in the same manner as process 400 of FIG. 4.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An animal control and monitoring apparatus comprising:
   a control system coupled to an animal being monitored;
   a position determining system (PDS) disposed on said animal, said position determining system coupled to said control system, said position determining system comprised of a satellite-based radio navigation system; and
   a stimulation system attached to said animal, said stimulation system coupled to said control system, said stimulation system adapted to receive information from said control system, said stimulation system further adapted to controllably alter the position of said animal in response to signals received from said control system.

2. The apparatus of claim 1 wherein said control system comprises:

a processor coupled to a bus, a physical memory coupled to said bus, an input/output device (I/O) coupled to said bus, and sensors coupled to said I/O, said sensors for accumulating sensor data for storage in said first physical memory.

3. The apparatus of claim 2 further comprising a base control subsystem remote from said control system, said base control subsystem comprising a second processor coupled to a second bus, a second physical memory coupled to said second bus, and a second input/output device (second I/O) coupled to said second bus.

4. The apparatus of claim 3 further comprising a one-way communication link coupling said control system to said base control subsystem wherein said one-way communication link provides for one-way transmission of control instructions from said base control subsystem to said control system.

5. The apparatus of claim 3 further comprising a two-way communication link coupling said control system and said base control subsystem wherein said two-way communication link provides for two-way communication between said base control subsystem and said control system.

6. The apparatus of claim 2 wherein said sensors include physiological monitoring devices for monitoring the health status and vital statistics of said animal.

7. The apparatus of claim 2 wherein said sensors include devices for detecting the body temperature, hormone level, milk level, and ovulation status of said animal.

8. The apparatus of claim 2 wherein said sensors include an electronic compass for providing data representative of the current orientation of said animal.

9. The apparatus of claim 2 wherein said sensors include a barometer, thermometer, or other weather detection device.

10. The apparatus of claim 1 wherein said control system is adapted to be disposed on said animal.

11. The apparatus of claim 1 wherein said control system is located remote from said animal and linked to said animal via a communication link.

12. The apparatus of claim 1 wherein said stimulation system is comprised of electrical stimulators.

13. The apparatus of claim 1 wherein said stimulation system is comprised of electrical stimulators affixed to various parts of said animal.

14. The apparatus of claim 1 wherein said stimulation system includes:

a rear stimulator, affixed to the hind quarters of said animal, for motivating said animal to move forward;

a right stimulator, affixed to the right side of said animal, for motivating said animal to move to its left; and a left stimulator, affixed to the left side of said animal, for motivating said animal to move to its right.

15. The apparatus of claim 14 wherein said stimulators include a transducer for providing an electrical shock to said animal.

16. The apparatus of claim 14 wherein said stimulators include a transducer for providing an audible stimulus to said animal.

17. A computer implemented method for controlling the position of an animal, said method comprising the computer implemented steps of:

reading a memory map of an area within which said animal is located;

receiving control instructions for controlling the position of said animal, wherein said control instructions define a designated sector within said area;

receiving initial position information from a position determining system (PDS) mounted to said animal, said initial position information indicating an initial position of said animal within said area;

determining whether said animal is within said designated sector;

receiving compass data from a compass mounted to said animal wherein said compass data is representative of the orientation of said animal;

determining a direction in which said animal is to proceed in order to move said animal to said designated sector, wherein said direction is determined based on said orientation of said animal, said initial position of said animal, and said position of said designated sector; and driving stimulators, which are mounted to said animal, in order to motivate said animal to move in said direction.

18. The computer implemented method of claim 17 wherein said position control instructions vary according to times of the day, week, or year.

19. The computer implemented method of claim 17 wherein said position control instructions include an instruction to move said animal to a designated sector within said area.

20. The computer implemented method of claim 17 wherein said position control instructions include an instruction to confine said animal to a designated sector within said area.

21. The computer implemented method of claim 17 wherein said step of driving stimulators includes:

driving a rear stimulator, affixed to the hind quarters of said animal, for motivating said animal to move forward;

driving a right stimulator, affixed to the right side of said animal, for motivating said animal to move to its left; and driving a left stimulator, affixed to the left side of said animal, for motivating said animal to move to its right.

22. A computer implemented method for controlling the position of an animal, said method comprising the computer implemented steps of:

reading a memory map of an area within which said animal is located;

receiving position control instructions defining a designated sector within said area;

receiving position information from a position determining system (PDS) mounted to said animal, said position information indicating an initial position of said animal within said area;

determining whether said animal is within said designated sector;

determining the orientation of said animal by:

applying an initial stimulation to said animal via stimulators located on the hind quarters of said animal, wherein said animal is assumed to respond to said initial stimulation on its hind quarters by moving forward, waiting a predetermined amount of time for said animal to respond to said initial stimulation, receiving information from said PDS indicating a second position of said animal, and determining the orientation of said animal by comparing said initial position of said animal with said second position of said animal;

determining a direction in which said animal is to proceed in order to move to said designated sector, wherein said direction is determined based on said orientation of said animal, said initial position of said animal, and said position of said designated sector; and driving stimulators, which are mounted to said animal, in order to motivate said animal to move in said direction.

23. The computer implemented method of claim 22 wherein said PDS is a global positioning system (GPS).

24. The computer implemented method of claim 22 wherein said control instructions include an instruction to confine said animal to said designated sector.

25. The computer implemented method of claim 22 wherein said step of driving stimulators includes:

driving a rear stimulator, affixed to the hind quarters of an animal, for motivating said animal to move forward;

driving a right stimulator, affixed to the right side of an animal, for motivating said animal to move to its left; and driving a left stimulator, affixed to the left side of said animal, for motivating said animal to move to its right.

* * * * *